May 9, 1939.  J. FREISTADTER  2,157,752
MOTOR LUBRICATING SYSTEM
Filed Aug. 6, 1936

Inventors
Jacob Freistadter

Patented May 9, 1939

2,157,752

UNITED STATES PATENT OFFICE 2,157,752

MOTOR LUBRICATING SYSTEM

Jacob Freistadter, Waltham, Mass., assignor to Waltham Watch Company, Waltham, Mass., a corporation of Massachusetts Application August 6, 1936, Serial No. 94,595

7 Claims. (Cl. 172—36)

The present invention relates to electric motors and means for lubricating the bearings of the rotor or armature shafts of such motors. It is particularly concerned with very small motors such as those used for driving electric clocks, of which quiet running is a practically essential attribute, while the conditions of use are such that regular attention to lubrication needs is impracticable.

The motors provided for driving domestic electric clocks are designed to run on alternating current at a rate in synchronism with the reversals of the current, which may be full synchronism or any selected fraction of synchronism. The rotor pivots of such motors are of small diameter, in the order of .12 of a centimeter, and the clearance between such pivots and the walls of their bearings is in the order of .0005 to .0025 centimeter. While specific dimensions vary more or less among different makes of motors, it is the fact that in all such motors the ratio of bearing clearance to pivot diameter is relatively large in comparison with larger and heavier machines. Such clearances must be large enough to prevent binding and permit entrance of lubricant; but if too large, permit side play of the pivots. Every reversal of polarity of the field magnet of the motor causes a lateral movement of the rotor to the limit of the bearing clearance; wherefore if the clearances are too large, a disagreeable humming noise is caused by striking of the pivots alternately on opposite sides of their bearings with every reversal of the 60 cycle current.

The necessary manufacturing tolerances in the diameters of such pivots and bearings are such that when a pivot of the smallest diameter happens to be assembled with a bearing of the largest diameter within the range of tolerances, the clearance may be nearly wide enough to permit of the objectionable noise being produced even when the motor is new. And even in the best conditions it needs only a small amount of wear to make the bearings loose enough for noisy side slap to occur.

Prior means of rotor pivot lubrication in such motors have not been effective to prevent such wear from taking place much too rapidly. It has been the practice to confine a body of oil-soaked wicking or felt in spaces contiguous to the bearings in the hope that oil would flow thence between the relatively moving surfaces. But such means have not proved satisfactory. Oil does not flow by capillary or entrainment of the rotating pivot throughout the whole length of the bearing, but only into a small length of the bearing adjacent to the reservoir space, wherefore a large proportion of the bearing runs dry and rapid wear occurs. But if the oil-soaked wick is put under pressure enough to force oil into the whole length of the bearing, the same pressure causes a continuous flow of oil through and out of the bearing until the quantity under pressure is exhausted, whereupon the bearing becomes dry and wear to the point of looseness occurs after only a briefly increased length of time.

I have approached the problem of lubricating such bearings from a new angle, and have solved it by making the rotor serve as, in effect, a pump operable to carry a thin film of oil from the reservoir spaces into the pivot bearings and progressively throughout the entire length of such bearings, in quantities sufficient to maintain adequate lubrication but not enough to drain the oil from the bearings wastefully. This conception and operative means for carrying it into effect constitute the invention for which I hereby solicit patent protection. A concrete embodiment of the principle is illustrated in the drawing in application to a type of motor now used in commercial electric clocks.

In the drawing,—

Like reference characters designate the same parts wherever they occur in all the figures.

Figure 1:
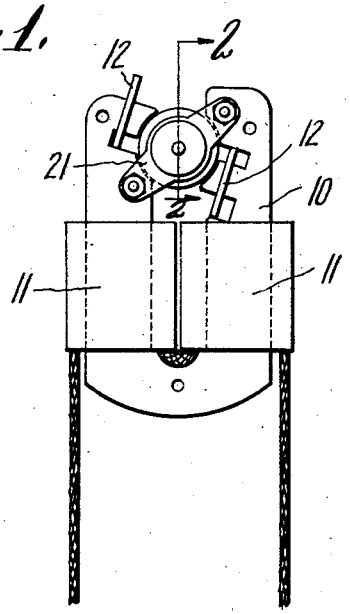
Fig. 1 is a side elevation of such a motor.
Figure 2:
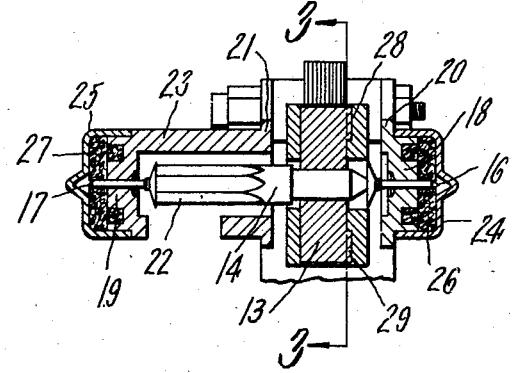
Fig. 2 is a cross section through the rotor axis of the motor taken on line 2—2 of Fig. 1 and shown on a larger scale.
Figure 3:
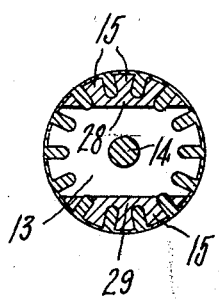
Fig. 3 is a detail sectional view taken on line 3—3 of Fig. 2.
Figure 4:
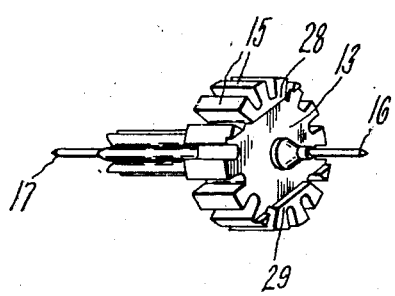
Fig. 4 is a perspective view of the iron core of the rotor showing the disposition of the masses of iron by which a constant reciprocation of the rotor and its pivots is maintained whenever the motor runs.

The motor here shown is of the self starting synchronous type adapted to run at a fraction of full synchronous speed when excited by alternating current. It comprises a field magnet 10 provided with exciting coils 11 and shaded poles 12 of well known character, the shading coils of which are shown at 12. The rotor or armature consists of an iron core 13 mounted on a shaft 14 and having an even number of radial notches in its circumference, between which are projections 15 constituting salient poles by which the rotational rate of the rotor is held to a definite and fixed ratio with respect to the periodicity of the alternating current. Such notches are filled, and the circumference and ends of the core enveloped and embraced by, masses of non-magnetic metal in which starting torque is developed to bring the rotor from rest up to the prescribed speed when current is turned into the field coils. Such non-magnetic masses are preferably formed integral with one another by being cast around the core.

On the ends of the shaft 14 are integral pivots 16, 17 which rotate in bearings 18 and 19 respectively carried by bridges 20 and 21 which are secured to the opposite pole pieces of the magnet core in positions clear of the shading coils 12. The rotor shaft 14 is extended to a considerable distance at one side of the rotor and formed as, or provided with, a pinion 22 for transmitting rotation to a train of reducing gears by which the hands of a clock may be driven. The bearing 19 is supported from bridge 21 by a potence 23 to afford space for such pinion.

Caps 24 and 25 are mounted and fitted tightly on the outer ends of the bearings 18 and 19. They provide enclosed spaces or oil reservoirs contiguous to the ends of the bearings and into which the shaft pivots project more or less. Preferably wicks 26 and 27, of any suitable fibrous material and construction, are placed in the oil reservoirs to hold the oil and provide capillary channels through which it may pass to the pivots.

Spaces are provided between the ends of the rotor and the bridges 20 and 21, between the shaft ends and the bearings, and between the pivot extremities and the caps 24 and 25 wide enough to permit a substantial movement of the rotor. And the rotor is provided with means for causing it to reciprocate axially, with constant and regular repetition of its movements, whenever and as long as the motor is in action.

The means for so reciprocating the rotor consists of masses of iron 28, 29 disposed on the rotor in such manner as to change the magnetic balance of the rotor with respect to the field with each quarter rotation; but they are mechanically balanced on opposite sides of the pivot axis so as not to cause any lateral vibration. As here shown, such iron masses are shallow segments on one end of the core 13, integral therewith, and preferably formed by cutting a wide and shallow groove of uniform depth diametrically across one end face of the core. The boundaries of such groove are parallel to one another and equally distant from the axis at opposite sides thereof. However, the specific details of these masses and the specific method of forming them here shown is not the prime essential of the invention, for they may be made or applied otherwise and located in other positions.

By virtue of the magnetic unbalance thus produced, the transverse plane of the core midway between the outer faces of the masses 28 and 29 and the opposite face of the core is brought by magnetic action substantially into coincidence with the plane midway between the lateral bounding faces of the magnet poles whenever the masses 28 and 29 are in register with the poles, while the plane midway between the bottom of the shallow groove previously defined and the opposite face of the core is brought into substantial coincidence with the median plane of the field magnet whenever the masses 28 and 29 register with the interpolar spaces of the magnet. Thus the entire rotor structure is shifted back and forth axially a distance substantially equal to half the axial projection of such masses during each 90° of rotation. The pivots are thereby advanced into and retracted from the oil reservoir spaces. When advanced into such a space the pivot picks up a film of oil which, in its next retraction, it carries into the bearing. Part of the oil film so displaced adheres to the bearing surface and is applied to an adjoining zone of the pivot when the latter is next advanced. Minute quantities of oil are thus successively withdrawn from the oil reservoir and successively carried and applied to zones of the pivots and bearing surfaces more and more remote from the reservoirs, whereby oil sufficient for lubricating the entire length of the bearings is constantly supplied and renewed, and wear of the pivots and bearings prevented for a greatly extended length of time. But the transfer of oil is not great or rapid enough to cause any accumulation at the inner end of the bearing or dripping and wastage of oil therefrom.

In the motor illustrated herein the distance of endwise reciprocation is .035 centimeter. I have found this adequate for the purpose; but of course do not limit the protection which I claim to a displacement of any specific amount, for the extent of such movement may be widely varied and made of any desired value to fit particular circumstances.

The oil in the reservoirs is not put under pressure, but reliance is placed solely on the pumping effect of the pivots to distribute it over the bearing surfaces. Consequently there is no flow and wastage of oil, but the supply is conserved in the greatest possible measure.

The foregoing explanation of the invention with reference to specific use in a clock motor is not to be construed as a limitation of the protection claimed either to that specific use or to self starting electric motors or even to synchronous motors. On the contrary, I claim protection for all useful applications of the principles as well as the details of the invention. I consider that the broad principle includes that of distributing oil in a shaft bearing by controlled endwise movement of the shaft pivot or trunnion, whether such movement is produced magnetically or by other means, and whether the machine in which it is effected is a prime mover or is otherwise driven.

What I claim and desire to secure by Letters Patent is:

1. The combination with a supporting structure having a bearing and a rotor having a pivot portion contained rotatably in said bearing and being movable endwise therein, of an oil reservoir contiguous to the outer orifice of said bearing into which the extremity of said pivot is adapted to protrude, and means for giving to the rotor a back and forth axial reciprocation simultaneously with its rotation, such as to cause alternate advance of the pivot into and withdrawal from said reservoir, whereby to effect transfer of oil from the reservoir into and through the bearing.

2. A machine comprising a stationary structure having alined bearings, a rotor having alined pivots occupying said bearings rotatably, said supporting structure and rotor being complementally constructed to permit endwise movement of the rotor, and the pivots being of suitable lengths to protrude more or less from the outer ends of the bearings in at least the outward limits of their respective movements, means for confining a quantity of oil contiguous to the outer ends of the bearings and in position to apply oil to the respectively adjacent pivots when protruded into such spaces, and means for producing a periodic back and forth endwise movement of the rotor in the course of its rotation sufficient to cause advance and retraction of portions of the pivots into and out of the oil supplies respectively contiguous to them.

3. A motor comprising a supporting structure having separated alined bearings, oil holding means mounted contiguous to the respective outer orifices of said bearings, a rotor structure having oppositely protruding alined pivots fitted to rotate and move endwise in said bearings and protruding at their outer extremities into the oil holding means, said supporting structure and rotor being complementally so formed as to permit endwise movement of the entire rotor including its pivots, and means for effecting back and forth endwise movement of the rotor simultaneously with rotation thereof.

4. An electric motor comprising a field magnet, a rotor including an iron core adapted to revolve between the poles of said magnet, bearings connected to said magnet having enclosed oil containing spaces contiguous to their outer ends, a rotor shaft on which said core is mounted having pivots fitted to rotate and reciprocate in said bearings, said shaft pivots and bearings being relatively so located as to support the core between the magnet poles and being constructed to permit axial displacement of the core in both directions from a mid position, said core being so magnetically unbalanced that the action of said magnet causes it to move back and forth endwise during each rotation.

5. An electric motor comprising a field magnet, a rotor having an iron core and a shaft, bearings connected with said magnet in position to support said shaft rotatably with the core between said magnet poles, the rotor core and shaft being free to move endwise with respect to the bearings, means for holding a supply of oil in contact with parts of said shaft which occupy said bearings, and magnetically unbalanced iron masses associated with such core in a manner to effect back and forth reciprocation of the core by magnetic action during the rotation of the core.

6. An electric motor comprising a stator having bearing and a rotor having pivots supported rotatably and reciprocatively in said bearings, the cooperating magnetic elements of said stator and rotor being in a condition of unbalance axially of the rotor such as to cause back and forth reciprocation of the rotor during its rotation, combined with means for delivering oil to a subordinate part of the length of said pivots, the reciprocating movement of the pivots being effective to distribute oil throughout substantially the entire extent of the bearing surfaces.

7. An electric motor comprising a field magnet, a rotor having an iron core and a shaft, bearings connected with said magnet in position to support said shaft rotatably with the core between said magnet poles, and means for maintaining a supply of oil in contact with parts of said shafts which occupy said bearing, the rotor core and shaft being free to move endwise with respect to the bearings and the core having axially projecting iron masses at one end spaced apart from one another but in mechanically balanced relation to one another at opposite sides of the rotor axis.

JACOB FREISTADTER.